United States Patent [19]

Hattori

[11] Patent Number: 4,512,753
[45] Date of Patent: Apr. 23, 1985

[54] V-BELT TRANSMISSION APPARATUS

[75] Inventor: Torao Hattori, Wako, Japan

[73] Assignee: Honda Giken Kogyo Kabushiki Kaisha, Tokyo, Japan

[21] Appl. No.: 589,285

[22] Filed: Mar. 14, 1984

[30] Foreign Application Priority Data

Mar. 14, 1983 [JP] Japan .................................. 58-40782
Mar. 14, 1983 [JP] Japan .................................. 58-40783
Mar. 14, 1983 [JP] Japan .................................. 58-40784

[51] Int. Cl.³ ............................ F16G 5/16; F16G 5/22
[52] U.S. Cl. ...................................... 474/242; 474/201
[58] Field of Search .................... 474/201, 242–246, 474/261, 262, 264, 265

[56] References Cited

U.S. PATENT DOCUMENTS 4,303,404 12/1981 Moore ................................. 474/242
4,365,965 12/1982 Russ, Sr. ............................ 474/201
4,371,361 2/1983 Giacosa ............................. 474/201
4,428,740 1/1984 Moore ................................. 474/242

FOREIGN PATENT DOCUMENTS 33-7762 9/1958 Japan.
8103183 7/1981 Netherlands ......................... 474/242

Primary Examiner—Stephen J. Novosad
Assistant Examiner—Bruce M. Kisliuk
Attorney, Agent, or Firm—Armstrong, Nikaido, Marmelstein & Kubovcik

[57] ABSTRACT

A V-belt assembly is provided which comprises an endless metallic belt and a plurality of V-shaped members disposed along the belt in the longitudinal direction of the belt. Each of the V-shaped members has a groove with a belt engaging surface at the bottom of the groove facing the belt. The V-shaped members also include pulley engaging surfaces for engaging the surfaces of pulleys in the transmission. A plurality of intermediate members are interposed between adjacent V-shaped members on the inside of the belt. The intermediate members are held between corresponding adjacent V-shaped members by intermediate member engaging surfaces of the V-shaped members. The intermediate members are movable towards and away from the belt along the intermediate member engaging surfaces. The side surfaces of the groove can be formed with a surface corresponding to the shape of the edge surface of the endless belt.

8 Claims, 11 Drawing Figures

V-BELT TRANSMISSION APPARATUS

BACKGROUND OF THE INVENTION

1. Field of the Invention

This invention relates to a V-belt transmission apparatus used for a stepless variable speed transmission for a vehicle or the like, and more particularly, to a V-belt transmission apparatus of the type having an endless type metallic belt with a large number of V-shaped metallic members. Each V-shaped metallic member has an engaging surface facing the metallic belt, arranged such that the metallic members are disposed in an array in the lengthwise direction of the endless metallic belt to form a V-belt assembly. This V-belt assembly is applied between a driving V-pulley and a driven V-pulley for effecting power transmission therebetween.

2. Description of the Prior Art

In prior art V-belt assemblies, intermediate members such as hollow rollers or the like are interposed between adjacent metallic members and positioned inside the endless metallic belt and are fastened or bound together from the outer periphery thereof with the metallic belt. The respective metallic members are connected to the metallic belt through the respective intermediate members.

SUMMARY OF THE INVENTION

The present invention is directed to a V-belt assembly for use in a V-belt transmission. The V-belt assembly comprises an endless metallic belt and a plurality of V-shaped members disposed along the belt in the longitudinal direction thereof. Each of the V-shaped members has a groove with a belt engaging surface at the bottom of the groove facing the belt. The V-shaped members also include pulley engaging surfaces for engaging the surfaces of pulleys in the transmission. A plurality of intermediate members are interposed between adjacent V-shaped members on the inside of the belt. The intermediate members are held between corresponding adjacent V-shaped members by intermediate member engaging surfaces of the V-shaped members. The intermediate members are movable towards and away from the belt along the intermediate member engaging surfaces. The side surfaces of the groove can be formed with a surface corresponding to the shape of the edge surface of the endless belt.

DETAILED DESCRIPTION OF THE PREFERRED EMBODIMENTS

Figure 1:
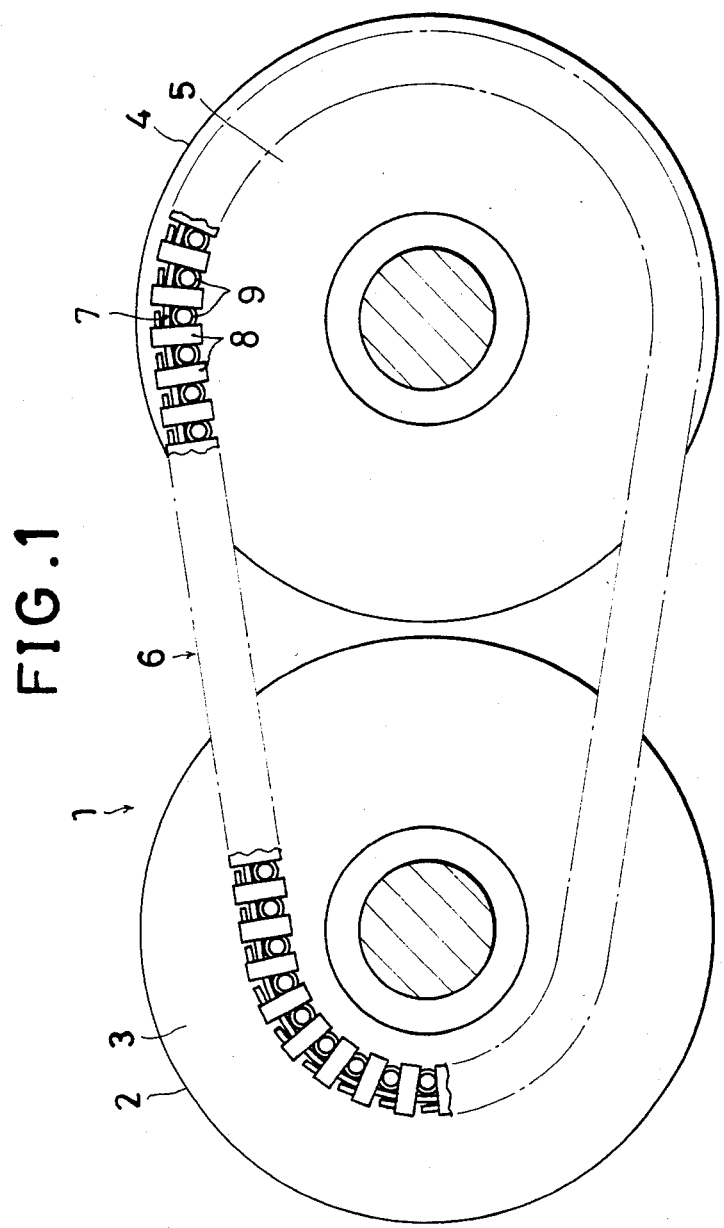
FIG. 1 is a side view, partly in section, of one embodiment of the present invention.
Figure 2:
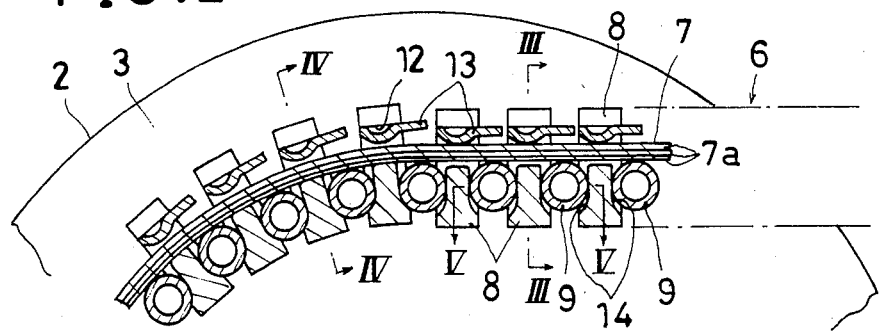
FIG. 2 is an enlarged sectional side view of an important portion thereof.

Referring to FIGS. 1 to 6, a variable speed transmission means 1 is used for a motorized two-wheeled vehicle. The transmission 1 is of the type having a V-belt assembly 6 between a V-groove 3 of a variable V-pulley 2 on a driving side and a V-groove 5 of a variable V-pulley 4 on a driven side, for effecting a power transmission between the two pulleys 2 and 4.

This V-belt assembly 6 has an endless metallic belt 7, which comprises plural continuous belt members 7a layered on one another. The assembly 6 is provided with a large number of V-shaped metallic members 8, each having lateral inclined surfaces 8a, which are brought into contact with the inner surfaces of each of the V-grooves 3 and 5, such that the metallic members 8 are disposed in an array in the lengthwise direction of the metallic belt 7. Intermediate members 9 are interposed between adjacent ones of the metallic members 8 inside the metallic belt 7, and are fastened or bound together from the outer periphery thereof with the metallic belt 7. The respective metallic members 8 are thus, connected to the metallic belt 7 through the respective intermediate members 9.

Each of the metallic members 8 are provided with a groove 11 which opens outwards and has at its bottom portion an engaging surface 10 facing the metallic belt 7. Each of the metallic members 8 is mounted in a groove 11 on the inside of the metallic belt 7 and a stopper member 13 facing the outer circumferential surface of the metallic belt 8 is mounted in the groove 11 in engagement with engaging grooves 2, in upper portions of side wall portions 11a on both sides of the groove 11. Thus, the respective metallic members 8 are prevented from coming off by the respective stopper members 13.

According to the present invention, each of the metallic members 8 are held between a corresponding pair of the intermediate members 9 that are located on mutually opposite sides thereof in the lengthwise direction of the metallic belt 7 and are movable inwards and outwards. Thus, when each of the metallic members 8 are brought into engagement with each of the V-pulleys 2 and 4, the metallic members are pushed by the V-groove of the corresponding V-pulley to slide outwards and are brought into a pressure contact connection, at the engaging surface 10, with a lower surface of the metallic belt 7. Consequently, when the respective metallic members 8 are brought into engagement with the driving side V-pulley 2 and are turned by the turning of the V-pulley 2, the metallic belt 7 can be tensioned with the driving force in accordance therewith.

Figure 3:
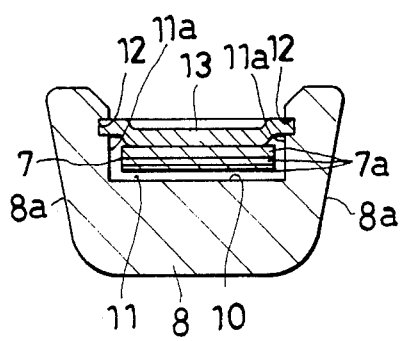
FIGS. 3 to 5 are sectional views taken respectively along the lines III—III, IV—IV and V—V in FIG. 2.
Figure 4:
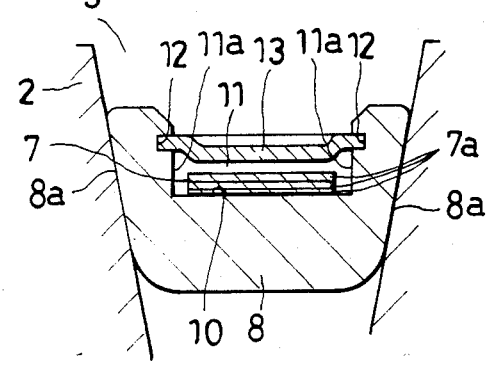
Figure 6:
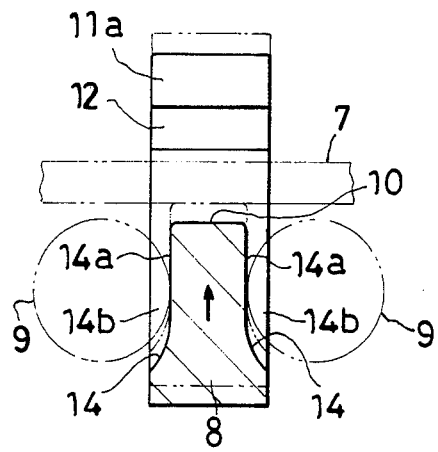
FIG. 6 is an enlarged sectional side view of a V-shaped metallic member thereof.
Figure 7:
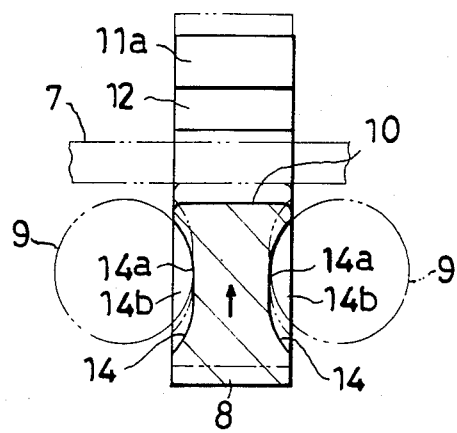
FIG. 7 is a sectional side view of an alternate embodiment of the present invention.

In more detail, each of the metallic members 8 are in engagement with a corresponding pair of the intermediate members 9 at its recessed receiving surfaces 14 on opposite surfaces located in the lengthwise direction of the metallic belt 7. Each of the recessed receiving surfaces 14 are not shaped into one which conforms to a shape of each of the intermediate members 9 but rather, are shaped such that a linear plane 14a extends in inner and outer directions, as shown in FIG. 6 or 7, so that each of the metallic members 8 may move inwards and outwards within the range of this linear plane 14a. Thus, at a linear movement region of the V-belt assembly 6, as shown in FIG. 3, there is a gap between the metallic belt 7 and the engaging surface 10 facing thereto. In a turning movement V-belt assembly 6 is engaged with each of the V-pulleys 2 and 4, as shown in FIG. 4 and each of the metallic members 8 are pushed by the pulley to move outwards, and the metallic belt 7 and the engaging surface 10 are in pressure contact one with another. This establishes a condition in which the metallic belt 7 and each of the metallic members 8 are firmly connected together.

In order to make smooth relative inclining motions of the respective V-shaped metallic members 8 during the turning movement, each of the intermediate members 9 are preferably formed with at least an arc shaped contact surface thereof in contact with each receiving surface 14. Additionally, it is preferable that some or all of the intermediate members 9 be formed with hollow resilient metallic members so that any torque change may be absorbed and any generation of a play gap which would be caused by elongation of the belt may be prevented by the resiliency thereof. Accordingly, each of the intermediate members 9 are made of a hollow slender roller type resilient metallic member.

Figure 5:
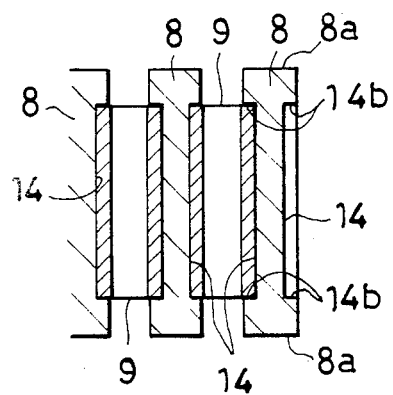

As shown in FIG. 5, the receiving surface 14 is formed to have opposite lateral side walls 14b in abutment with lateral end surfaces of each intermediate member 9, and thereby the respective V-shaped metallic members 8 are restricted from movements in the lateral directions resulting in smooth contact with each of the V-pulleys 2 and 4.

Figure 8:
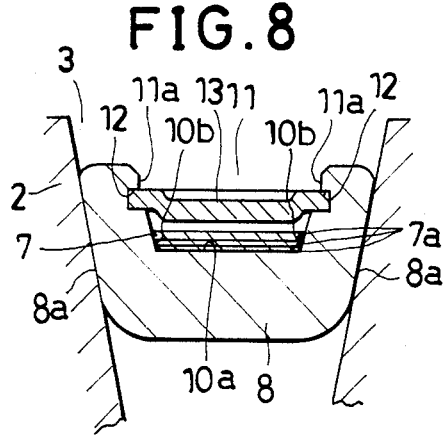
FIGS. 8 to 11 are sectional views similar to FIG. 4 of additional embodiments of the present invention.
Figure 9:
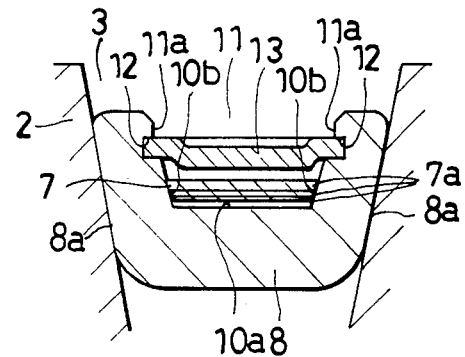

In the foregoing embodiment, the engaging surface 10 is brought into pressure contact with the inner surface of the metallic belt 7, but the present invention is not limited thereto. Namely, a modification can be made as shown in FIG. 8, for example, in which the metallic belt 7 is formed with a nearly V-shape cross-section that is gradually narrower towards the inside, and the engaging surface 10 is formed with a corresponding nearly V-shape cross-section. With this embodiment, when the respective V-shaped metallic members 8 are moved outwards, the engagement between the metallic belt 7 and each of the V-shaped metallic members 8 is maintained at their respective V-shaped surfaces so that the connecting force between the two can be increased. In more detail, the engaging surface 10 is composed of a flat plane 10a facing the inner surface of the metallic belt 7 and inclined surfaces 10b on the lateral sides thereof. Thus, even when the flat plane 10a is not brought in pressure contact with the inner surface of the metallic belt 7, as shown in FIG. 9, the metallic belt 7 is wedged between the inclined surfaces 10b and a good connection is obtained between the belt 7 and the V-shaped metallic member 8.

Figure 10:
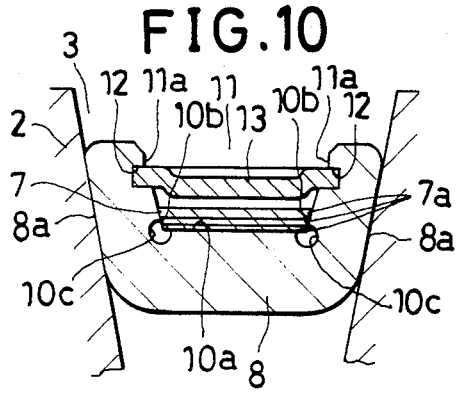

The embodiment shown in FIG. 8 may be further modified as shown in FIG. 10. In this modified embodiment, in order to improve a bending property of the metallic belt 7, the belt 7 comprises plural steel belt members 7a of different thicknesses which are placed one upon another in layers which are gradually thinner towards the inside. Additionally, in order to minimize the damage of the innermost thinnest member 7a caused by the action of the side pressures, right and left corner edge portions of the nearly V-shaped engaging surface 10b are formed with concave portions 10c, so that the innermost layer member 7a does not make side contact.

Figure 11:
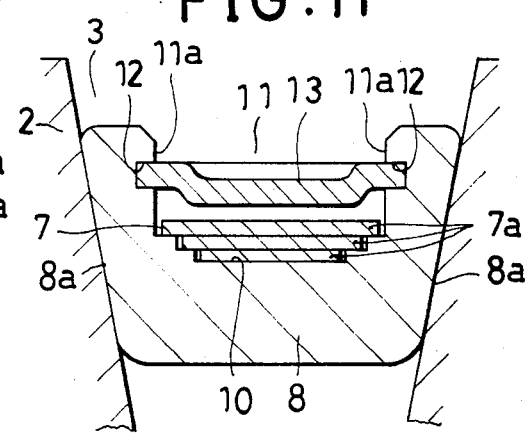

In still another embodiment, as shown in FIG. 11, the continuous belt members 7a forming the metallic belt 7 are placed one upon another in layers which are gradually narrower towards the innermost side so that each of the lateral side surfaces of the metallic belt 7 are in the form of a stepped V-shape cross-section. Each taper surface 11a of the engaging surface 10 is formed into a corresponding stepped V-shape cross-section conforming thereto. In this embodiment, the metallic belt 7 is in engagement, at respective belt members 7a, with the engaging surface 10 so that the connecting force between the two can be increased as a whole.

Thus, according to the present invention, the respective V-shaped metallic members are so arranged that, when they are brought into engagement with the respective V-pulleys, the metallic members are forced to move outwards and are brought into a pressure contact connection with the inner circumferential surface of the metallic belt. Thus, the connection of the metallic members with the metallic belt is increased in comparison with prior art devices where the V-shaped metallic members are connected to the metallic belt only through the intermediate members.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A V-belt assembly for use in a V-belt transmission, said V-belt assembly comprising:
   (a) an endless belt;
   (b) a plurality of V-shaped members disposed along said belt in the longitudinal direction thereof, each of said members having a belt engaging surface facing said belt and pulley engaging surfaces for engaging the surfaces of pulleys in the transmission; and
   (c) a plurality of intermediate members, each intermediate member being interposed between adjacent V-shaped members on the inside of said belt, said intermediate members being held between corresponding adjacent V-shaped members by intermediate member engaging surfaces thereof, wherein said intermediate members are movable towards and away from said belt along said intermediate member engaging surfaces.

2. A V-belt assembly as set forth in claim 1, wherein said intermediate member engaging surfaces include an arc-shaped portion.

3. A V-belt assembly as set forth in claim 1, wherein said intermediate members comprise hollow resilient means.

4. A V-belt assembly as set forth in claim 1, wherein the edges of said belt are inclined such that the inner surface of said belt is smaller than the outer surface thereof, and wherein surfaces of said V-shaped members adjacent said belt engaging surfaces thereof are inclined to correspond to the inclined edges of said belt.

5. A V-belt apparatus as set forth in claim 1, wherein said belt comprises a plurality of layers, each layer having a decreased width with respect to the adjacent outer layer such that the edges of said belt have a step shape and wherein surfaces of said V-shaped members adjacent said belt engaging surfaces thereof have corresponding step surfaces.

6. A V-belt apparatus as set forth in claim 1, wherein V-shaped members include a groove therein, said belt engaging surface being located at the bottom of said groove, said apparatus further including stopper means fixedly positioned in said groove such that said belt is positioned between said belt engaging surface and said stopper means, whereby said belt is prevented from coming out of said groove.

7. A V-belt apparatus as set forth in claim 6, wherein said grooves include notches on the sides thereof and said stopper means is engaged in said notches.

8. A V-belt apparatus as set forth in claim 6, wherein said grooves include concave portions at the junction of the side portions and bottom portions thereof.

* * * * *